United States Patent
Gao et al.

(10) Patent No.: US 12,231,368 B2
(45) Date of Patent: Feb. 18, 2025

(54) HARQ FEEDBACK METHOD FOR SPS PDSCH WITH SHORTER PERIODICITY, TERMINAL, BASE STATION AND STORAGE MEDIUM

(71) Applicant: DATANG MOBILE COMMUNICATIONS EQUIPMENT CO., LTD., Beijing (CN)

(72) Inventors: Xuejuan Gao, Beijing (CN); Qianqian Si, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 377 days.

(21) Appl. No.: 17/775,293

(22) PCT Filed: Nov. 3, 2020

(86) PCT No.: PCT/CN2020/126145
§ 371 (c)(1),
(2) Date: May 8, 2022

(87) PCT Pub. No.: WO2021/088800
PCT Pub. Date: May 14, 2021

(65) Prior Publication Data
US 2022/0399979 A1 Dec. 15, 2022

(30) Foreign Application Priority Data

Nov. 8, 2019 (CN) .......................... 201911089860.6

(51) Int. Cl.
*H04L 5/00* (2006.01)
*H04L 1/1607* (2023.01)
(Continued)

(52) U.S. Cl.
CPC .......... *H04L 5/0055* (2013.01); *H04L 1/1614* (2013.01); *H04L 1/1812* (2013.01)

(58) Field of Classification Search
CPC ... H04L 5/0055; H04L 1/1614; H04L 1/1812; H04L 5/001; H04L 1/1861; H04L 1/1854; H04L 1/1607
See application file for complete search history.

(56) References Cited

U.S. PATENT DOCUMENTS 11,765,690 B2 * 9/2023 Huang .................. H04L 1/1864
370/329
11,990,999 B2 * 5/2024 Xiao ..................... H04L 1/1864
(Continued)

FOREIGN PATENT DOCUMENTS

CN     105207757 A    12/2015
CN     107231218 A    10/2017
(Continued)

OTHER PUBLICATIONS

CATT,"Discussion on PUSCH resource collision and DL SPS enhancement",3GPP TSG RAN WG1 Meeting #98bis, Chongqing, China, Oct. 14-20, 2019, total 7 pages, R1-1910347.
(Continued)

*Primary Examiner* — Harry H Kim
(74) *Attorney, Agent, or Firm* — Kilpatrick Townsend & Stockton LLP

(57) ABSTRACT

Embodiments of the present application provide an HARQ feedback method, a terminal, a base station and a storage medium. The method includes: adding, in an HARQ-ACK codebook which is determined according to a time offset K1 set and is transmitted in a time unit, A bits HARQ-ACK feedback corresponding to SPS PDSCHs to obtain an HARQ-ACK codebook to be transmitted; and transmitting the HARQ-ACK codebook. In the embodiments of the present application, in case that the SPS PDSCH is deferred,
(Continued)

or is determined to feed back HARQ-ACK in a time unit based on a K1 value that does not belong to the K1 set, the HARQ-ACK of the SPS PDSCH needs to be added in the HARQ-ACK codebook determined based on the K1 set and corresponding to the time unit, so that correct HARQ-ACK transmission is ensured, and the HARQ-ACK of the SPS PDSCH is prevented from being discarded.

20 Claims, 3 Drawing Sheets

(51) Int. Cl.
*H04L 1/1812* (2023.01)
*H04L 1/1829* (2023.01)

(56) References Cited

U.S. PATENT DOCUMENTS

| | | | |
|---|---|---|---|
| 2017/0134140 | A1 | 5/2017 | Park |
| 2017/0289852 | A1 | 10/2017 | Yang et al. |
| 2019/0159238 | A1 | 5/2019 | Kim et al. |
| 2021/0100013 | A1* | 4/2021 | Khoshnevisan ...... H04L 1/0061 |
| 2022/0159692 | A1* | 5/2022 | Lee ...................... H04L 5/0053 |
| 2022/0303064 | A1* | 9/2022 | Yang .................... H04W 72/23 |
| 2023/0291505 | A1* | 9/2023 | Park ...................... H04L 5/0096 |
| 2024/0023135 | A1* | 1/2024 | Ye ........................ H04L 1/1822 |

FOREIGN PATENT DOCUMENTS

| | | |
|---|---|---|
| CN | 107347002 A | 11/2017 |
| CN | 110034868 A | 7/2019 |
| CN | 110138523 A | 8/2019 |
| CN | 110311762 A | 10/2019 |
| CN | 110351018 A | 10/2019 |
| EP | 3547593 A1 | 10/2019 |

OTHER PUBLICATIONS

NTT DOCOMO, Inc.,"Discussions on DL SPS enhancement", 3GPP TSG RAN WG1 #98bis, Chongqing, China, Oct. 14-20, 2019, total 10 pages, R1-1911182.
Qualcomm Incorporated,"Summary of Maintenance for DL/UL Scheduling", 3GPP TSG-RAN WG1 Meeting #93, Busan, Korea, May 21-25, 2018, total 30 pages, R1-1807711.
Li Chen."Research on the Technology of Latency Reduction for 5G", Beijing University of Posts and Telecommunications, Beijing, China, total 75 pages, Jan. 24, 2018.
European Patent Office, Extended European Search Report Issued in Application No. 20883850.8, Nov. 10, 2023, Germany, 8 pages.
Huawei et al., "Other aspects for URLLC/IIOT enhancements", 3GPP TSG RAN WG1 Meeting #98bis, Chongqing, China, Oct. 14-20, 2019, total 7 pages, R1-1910398.
Fujitsu, "Discussion on DL SPS enhancement", 3GPP TSG RAN WG1 #98bis, Chongqing, China, Oct. 14-20, 2019, total 3 pages, R1-1910189.

* cited by examiner

HARQ FEEDBACK METHOD FOR SPS PDSCH WITH SHORTER PERIODICITY, TERMINAL, BASE STATION AND STORAGE MEDIUM

CROSS-REFERENCE TO RELATED APPLICATION

The present application is a US National Stage of International Application No. PCT/CN2020/126145, filed on Nov. 3, 2020, which claims priority to Chinese Application No. 201911089860.6 filed on Nov. 8, 2019, entitled "HARQ Feedback Method, Terminal, Base Station and Storage Medium", which are hereby incorporated by reference in their entireties.

FIELD OF TECHNOLOGY

The present application relates to the field of wireless communication, and in particular, to an HARQ feedback method, a terminal, a base station and a storage medium.

BACKGROUND

In NR Rel-15, only one HARQ-ACK feedback information that supports semi-persistent scheduling (Semi-Persistent Scheduling, SPS) physical downlink shared channel (Physical Downlink Shared Channel, PDSCH) is allowed to be transmitted in one physical uplink control channel (Physical Uplink Control Channel, PUCCH). In Rel-16, a shorter SPS PDSCH transmission period will be supported, for instance, in case that the unit of the transmission period is slot, for example, the period is one slot. Under one SPS PDSCH configuration, a time offset K1 between the SPS PDSCH transmission and the corresponding HARQ-ACK feedback position can be indicated by activated downlink control information (Downlink Control Information, DCI), and only one K1 value can be indicated in the activated DCI, or the K1 value can be configured by high-level signaling. In case that all of the SPS PDSCH transmissions in a plurality of SPS PDSCH transmission opportunities determined according to the period corresponding to the SPS configuration and the activation signaling use the same K1 value to determine the time domain position (such as a slot or a sub-slot) of the HARQ-ACK feedback, for time division duplex (Time Division Duplex, TDD) scenarios, considering different uplink and downlink configuration ratios, there may be cases in which the PUCCH resources where the transmissions of the HARQ-ACK of the SPS PDSCHs (SPS HARQ-ACK) are located overlap with the downlink symbols, as a result, these SPS PDSCHs cannot provide normal HARQ-ACK feedback, and thus the reduced delay provided by short-period SPS transmission cannot be achieved in that HARQ-ACKs of short-period SPS PDSCHs are discarded excessively. The above-mentioned time offset K1 is in units of time, and specifically indicates the interval between the time unit where a downlink transmission is located and the time unit where the HARQ-ACK feedback of the downlink transmission is transmitted, for instance, in the unit of slot, in case that a PDSCH is transmitted in slot n, and the corresponding K1=2, then it can be determined that the HARQ-ACK of this PDSCH is transmitted in slot n+2. The time unit can be described as a slot or a sub-slot.

FIG. 1 is a schematic diagram of the HARQ-ACK feedback of the SPS PDSCH in the related art. As shown in FIG. 1, the transmission period of the SPS PDSCH is one slot. In case that the K1 value indicated in the activated DCI is 2, the HARQ-ACK of the SPS PDSCH in the slot n needs to be transmitted in the slot n+2, but the slot n+2 is a downlink slot, and according to the related art, the UE will discard the HARQ-ACK of the SPS PDSCH in slot n. At this point, a valid PUCCH transmission position for transmitting SPS HARQ-ACK can be obtained by delaying the HARQ-ACK to the subsequent slot or configuring different K1s for the SPS PDSCHs in different transmission opportunities under the same SPS configuration according to the uplink and downlink configuration ratio. In case that there is still an HARQ-ACK having a corresponding physical downlink control channel (Physical Downlink Control Channel, PDCCH) (referred to as dynamic HARQ-ACK) transmitting in the transmission slot that is deferred, or in the transmission slot of the SPS HARQ-ACK determined according to the K1 value corresponding to the SPS PDSCH, the SPS HARQ-ACK and the dynamic HARQ-ACK need to be multiplexed and transmitted in the same PUCCH. However, according to the traditional method for determining codebook of HARQ-ACK, the above-mentioned transmission slot of the SPS PDSCH may not be included in the slot range determined by the HARQ-ACK codebook according to a K1 set, so that the HARQ-ACK codebook cannot include the HARQ-ACK feedback that is deferred, or the HARQ-ACK feedback of the SPS PDSCH that uses K1 not in the K1 set to determine the HARQ-ACK feedback slot.

SUMMARY

In order to solve at least the problems in the related art, embodiments of the present application provide an HARQ feedback method, a terminal, a base station, and a storage medium.

In a first aspect, embodiments of the present application provide an HARQ feedback method, including:

adding, in an HARQ-ACK codebook which is determined according to a time offset K1 set and is transmitted in a time unit, A bits HARQ-ACK feedback corresponding to SPS PDSCHs to obtain an HARQ-ACK codebook to be transmitted; where the A satisfies preset conditions that the A is a number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set; and transmitting the HARQ-ACK codebook to be transmitted.

In an embodiment, the A bits HARQ-ACK corresponding to the SPS PDSCHs is concatenated at the beginning or end of the HARQ-ACK codebook.

In an embodiment, the HARQ-ACK codebook is a dynamic or semi-static HARQ-ACK codebook.

In an embodiment, in case that the HARQ-ACK codebook is the semi-static HARQ-ACK codebook, the adding A bits HARQ-ACK feedback corresponding to SPS PDSCHs to obtain an HARQ-ACK codebook to be transmitted includes:

determining a corresponding HARQ-ACK codebook based on the K1 set for each carrier, adding HARQ-ACKs of SPS PDSCHs transmitted in the carrier and satisfying the preset conditions in the corresponding HARQ-ACK codebook of each carrier to obtain a corresponding concatenated HARQ-ACK codebook of each carrier, where a sum of the number of HARQ- ACKs of the SPS PDSCHs added in the HARQ-ACK codebook corresponding to each carrier is equal to A; and obtaining the HARQ-ACK codebook to be transmitted by concatenating the corresponding concatenated HARQ-ACK codebooks of each carrier according to an order of carrier index.

In an embodiment, in case that the HARQ-ACK codebook is the semi-static HARQ-ACK codebook, correspondingly, the adding A bits HARQ-ACK feedback corresponding to SPS PDSCHs to obtain an HARQ-ACK codebook to be transmitted includes:

determining a corresponding HARQ-ACK codebook based on the K1 set for each carrier, and obtaining an HARQ-ACK codebook of a plurality of carriers by concatenating the corresponding HARQ-ACK codebooks of each carrier; and determining HARQ-ACKs of A SPS PDSCHs transmitted in all carriers and satisfying the preset conditions, and obtaining the HARQ-ACK codebook to be transmitted by concatenating the A bits HARQ-ACKs with the HARQ-ACK codebook of the plurality of carriers.

In an embodiment, the A bits HARQ-ACK corresponding to the SPS PDSCHs is ordered according to at least one of a number of corresponding HARQ processes, an index of corresponding SPS configurations, an order of frequency domain positions and an order of time domain positions of A SPS PDSCH transmissions.

In an embodiment, any of the time units is defined as slot and sub-slot.

In a second aspect, embodiments of the present application provide an HARQ feedback method, including:

receiving, in a time unit, an HARQ-ACK codebook sent by a terminal, where the HARQ-ACK codebook is obtained by adding A bits HARQ-ACK feedback corresponding to SPS PDSCHs in an HARQ-ACK codebook determined according to a time offset K1 set by the terminal; and the A satisfies preset conditions that the A is a number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set.

In an embodiment, the A bits HARQ-ACK corresponding to the SPS PDSCHs is concatenated at the beginning or end of the HARQ-ACK codebook.

In an embodiment, the HARQ-ACK codebook is a dynamic or semi-static HARQ-ACK codebook.

In an embodiment, in case that the HARQ-ACK codebook is the semi-static HARQ-ACK codebook, the HARQ-ACK codebook is obtained by the terminal in the following manner:

determining a corresponding HARQ-ACK codebook based on the K1 set for each carrier, adding HARQ-ACKs of SPS PDSCHs transmitted in the carrier and satisfying the preset conditions in the corresponding HARQ-ACK codebook of each carrier to obtain a corresponding concatenated HARQ-ACK codebook of each carrier, where a sum of the number of HARQ-ACKs of the SPS PDSCHs added in the HARQ-ACK codebook corresponding to each carrier is equal to A; and obtaining the HARQ-ACK codebook by concatenating the corresponding concatenated HARQ-ACK codebooks of all carrier one after another according to an order of carrier indexes.

In an embodiment, in case that the HARQ-ACK codebook is the semi-static HARQ-ACK codebook, the HARQ-ACK codebook is obtained by the terminal in the following manner:

determining a corresponding HARQ-ACK codebook based on the K1 set for each carrier, and obtaining an HARQ-ACK codebook of a plurality of carriers by concatenating the corresponding HARQ-ACK codebooks of each carrier; and determining HARQ-ACKs of A SPS PDSCHs transmitted in all carriers and satisfying the preset conditions, and obtaining the HARQ-ACK codebook by concatenating the A bits HARQ-ACKs with the HARQ-ACK codebook of the plurality of carriers.

In an embodiment, the A bits HARQ-ACK corresponding to the SPS PDSCHs is ordered according to at least one of a number of corresponding HARQ processes, an index of corresponding SPS configurations, an order of frequency domain positions and an order of time domain positions of A SPS PDSCH transmissions.

In an embodiment, any of the time units is defined as slot and sub-slot.

In a third aspect, embodiments of the present application provide a terminal, including a memory, a processor and programs stored in the memory and executable by the processor, where the programs, in case of being executed by the processor, cause the processor to perform the following steps of:

adding, in an HARQ-ACK codebook which is determined according to a time offset K1 set and is transmitted in a time unit, A bits HARQ-ACK feedback corresponding to SPS PDSCHs to obtain an HARQ-ACK codebook to be transmitted; where the A satisfies preset conditions that the A is a number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set; and transmitting the HARQ-ACK codebook to be transmitted.

In an embodiment, the A bits HARQ-ACK corresponding to the SPS PDSCHs is concatenated at the beginning or end of the HARQ-ACK codebook.

In an embodiment, the HARQ-ACK codebook is a dynamic or semi-static HARQ-ACK codebook.

In an embodiment, in case that the HARQ-ACK codebook is the semi-static HARQ-ACK codebook, correspondingly, the adding A bits HARQ-ACK feedback corresponding to SPS PDSCHs to obtain an HARQ-ACK codebook to be transmitted includes:

determining a corresponding HARQ-ACK codebook based on the K1 set for each carrier, adding HARQ-ACKs of SPS PDSCHs transmitted in the carrier and satisfying the preset conditions in the corresponding HARQ-ACK codebook of each carrier to obtain a corresponding concatenated HARQ-ACK codebook of each carrier, where a sum of the number of HARQ-ACKs of the SPS PDSCHs added in the HARQ-ACK codebook corresponding to each carrier is equal to A; and obtaining the HARQ-ACK codebook to be transmitted by concatenating the corresponding concatenated HARQ-ACK codebooks corresponding of all carriers in one after another according to an order of carrier indexes.

In an embodiment, in case that the HARQ-ACK codebook is the semi-static HARQ-ACK codebook, the adding A bits HARQ-ACK feedback corresponding to SPS PDSCHs to obtain an HARQ-ACK codebook to be transmitted includes:

determining a corresponding HARQ-ACK codebook based on the K1 set for each carrier, and obtaining an HARQ-ACK codebook of a plurality of carriers by concatenating the corresponding HARQ-ACK codebooks of each carrier; and determining HARQ-ACKs of A SPS PDSCHs transmitted in all carriers and satisfying the preset conditions, and obtaining the HARQ-ACK codebook to be transmitted by concatenating the A bits HARQ-ACKs with the HARQ-ACK codebook of the plurality of carriers to obtain the HARQ-ACK codebook to be transmitted.

In an embodiment, the A bits HARQ-ACK corresponding to the SPS PDSCHs is ordered according to at least one of a number of corresponding HARQ processes, an index of corresponding SPS configurations, an order of frequency domain positions and an order of time domain positions of A SPS PDSCH transmissions.

In an embodiment, any of the time units is defined as slot and sub-slot.

In a fourth aspect, embodiments of the present application provide a base station, including a memory, a processor and programs stored in the memory and executable by the processor, where the programs, in case of being executed by the processor, cause the processor to perform the following steps of:

receiving an HARQ-ACK codebook sent by a terminal, where the HARQ-ACK codebook is obtained by adding A bits HARQ-ACK feedback corresponding to SPS PDSCHs in an HARQ-ACK codebook determined according to a time offset K1 set by the terminal; and the A satisfies preset conditions that the A is a number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set.

In an embodiment, the A bits HARQ-ACK corresponding to the SPS PDSCHs is concatenated at the beginning or end of the HARQ-ACK codebook.

In an embodiment, the HARQ-ACK codebook is a dynamic or semi-static HARQ-ACK codebook.

In an embodiment, in case that the HARQ-ACK codebook is the semi-static HARQ-ACK codebook, correspondingly, the HARQ-ACK codebook is obtained by the terminal in the following manner:

determining a corresponding HARQ-ACK codebook based on the K1 set for each carrier, adding HARQ-ACKs of SPS PDSCHs transmitted in the carrier and satisfying the preset conditions in the corresponding HARQ-ACK codebook of each carrier to obtain a corresponding concatenated HARQ-ACK codebook of each carrier, where a sum of the number of HARQ-ACKs of the SPS PDSCHs added in the HARQ-ACK codebook corresponding to each carrier is equal to A; and obtaining the HARQ-ACK codebook by concatenating the corresponding concatenated HARQ-ACK codebooks of all carrier one after another according to an order carrier indexes.

In an embodiment, in case that the HARQ-ACK codebook is the semi-static HARQ-ACK codebook, correspondingly, the HARQ-ACK codebook is obtained by the terminal in the following manner:

determining a corresponding HARQ-ACK codebook based on the K1 set for each carrier, and obtaining an HARQ-ACK codebook of a plurality of carriers by concatenating the corresponding HARQ-ACK codebooks of each carrier; and determining HARQ-ACKs of A SPS PDSCHs transmitted in all carriers and satisfying the preset conditions, and obtaining the HARQ-ACK codebook by concatenating the A bits HARQ-ACKs with the HARQ-ACK codebook of the plurality of carriers.

In an embodiment, the A bits HARQ-ACK corresponding to the SPS PDSCHs is ordered according to at least one of a number of corresponding HARQ processes, an index of corresponding SPS configurations, an order of frequency domain positions and an order of time domain positions of A SPS PDSCH transmissions.

In an embodiment, any of the time units is defined as slot and sub-slot.

In a fifth aspect, embodiments of the present application provide a terminal, including:

a processing module, configured to add, in an HARQ-ACK codebook which is determined according to a time offset K1 set and is transmitted in a time unit, A bits HARQ-ACK feedback corresponding to SPS PDSCHs to obtain an HARQ-ACK codebook to be transmitted; where the A satisfies preset conditions that the A is a number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set; and a transmitting module, configured to transmit the HARQ-ACK codebook to be transmitted.

In a sixth aspect, embodiments of the present application provide a base station, including:

a receiving module, configured to receive, in a time unit, an HARQ-ACK codebook sent by a terminal, where the HARQ-ACK codebook is obtained by adding A bits HARQ-ACK feedback corresponding to SPS PDSCHs in an HARQ-ACK codebook determined according to a time offset K1 set by the terminal; and the A satisfies preset conditions that the A is a number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set.

In a seventh aspect, embodiments of the present application provide a non-transitory computer-readable storage medium, having computer programs stored therein, where in case that the computer programs are executed by a processor, the HARQ feedback method of the first or second aspect is performed.

According to the HARQ feedback method, terminal, base station, and storage medium provided by the embodiments of the present application, in case that the SPS PDSCH is deferred, or is determined to feed back HARQ-ACK in a time unit based on a K1 value not belonging to a K1 set, the HARQ-ACK of the SPS PDSCH needs to be added in the HARQ-ACK codebook determined based on the K1 set and corresponding to the time unit, so that correct HARQ-ACK transmission is ensured, and the HARQ-ACK of the SPS PDSCH is prevented from being discarded.

BRIEF DESCRIPTION OF THE DRAWINGS

In order to more clearly illustrate the embodiments of the embodiments of the present application or the related art, the accompanying drawings required to be used in the description of the embodiments or the related art will be briefly introduced as follows. The drawings in the following description are part of embodiments of the present application.

DETAILED DESCRIPTION

Figure 1:
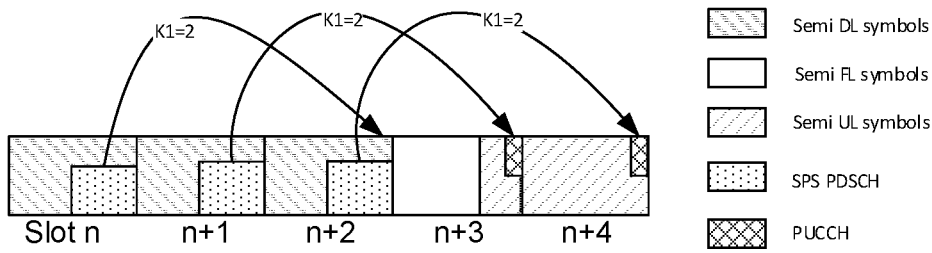
FIG. 1 is a schematic diagram of an HARQ-ACK feedback of SPS PDSCH according to the related art.

In order to explain the embodiments of the present application more clearly, the embodiments of the present application will be clearly described below in conjunction with the drawings in the embodiments of the present application. Obviously, the described embodiments are part of embodiments of the present application, rather than all of the embodiments. Based on the embodiments in the present application.

In the 5G NR system, two transmission modes are supported, and one of them is SPS PDSCH transmission, and the other is PDSCH having a corresponding PDCCH (i.e., dynamic PDSCH) transmission (i.e., this PDSCH is transmitted by a PDCCH scheduling). In case that SPS transmission is configured, the RNTI (e.g., CS-RNTI) corresponding to the SPS will be configured by the high-layer signaling, which is used to scramble the PDCCH for activating and deactivating the SPS transmission, and the transmission period of the SPS PDSCH will also be accordingly configured by the high-layer signaling. In case that there is a service that requires an SPS transmission, the base station can activate the terminal to perform SPS transmission according to the period of the SPS configuration by transmitting an activated PDCCH, where the activated PDCCH includes related scheduling information such as frequency domain resource allocation, time domain resource allocation, MCS, etc., which is used to determine the transmission opportunity of SPS PDSCH.

N candidate HARQ-ACK timing values (i.e., K1 values, which are used to describe the time interval between a PDSCH or SPS release PDCCH and the PUCCH that transmits its HARQ-ACK feedback information, for example, the unit of K1 value can be slot or sub-slot) for the terminal can be pre-configured by the high-layer signaling, where the value range of N can be 1 to 8. The HARQ-ACK timing of the PDSCH having the corresponding PDCCH is any one of N values pre-configured by the higher layer signaling which is indicated by the $\lceil \log\_2 (N) \rceil$ bits HARQ-ACK timing indication field in the PDCCH. For SPS PDSCH, since there is no corresponding PDCCH, the HARQ-ACK timing of SPS PDSCH is determined by the HARQ-ACK timing indication field in the PDCCH that activates SPS PDSCH transmission; in case that only one K1 value is configured by the high-level signaling, then this K1 value is directly used, rather than being determined by the HARQ-ACK timing indication field in the PDCCH. In each SPS transmission opportunity corresponding to one SPS transmission, the same K1 value is used to determine the transmission time domain position of the HARQ-ACK feedback of the SPS PDSCH.

For PDSCH transmission having PDCCH, the PUCCH resource used by HARQ-ACK feedback of the PDSCH transmission is determined according to the PUCCH resource indication (PUCCH Resource Indication, PRI) information field in the PDCCH. Specifically, 1 to 4 PUCCH resource sets for the terminal can be pre-configured by the high-level signaling, and different PUCCH resource sets correspond to different transmission bit ranges of uplink control information (Uplink Control Information, UCI). The terminal can select a PUCCH resource set according to the total number of bits in UCI to be transmitted, and each PUCCH resource set can include a plurality of PUCCH resources. In the PUCCH resource set determined according to the number of bits in UCI, one of the resources in the PUCCH resource set can be further determined through the 3-bits PRI in the PDCCH for UCI transmission (in case that the number of PUCCH resources in the PUCCH resource set is greater than 8, it needs to be determined in combination with the CCE index of the PDCCH).

For SPS PDSCH transmission, in case that the corresponding HARQ-ACK and the HARQ-ACK corresponding to the PDSCH transmission having PDCCH are transmitted in the same PUCCH (e.g., being determined to transmit in the same slot or sub-slot according to K1, respectively), the PUCCH resource is determined according to the above-mentioned method. In case that there is only HARQ-ACK feedback of the SPS PDSCH in a PUCCH, since there is no corresponding PDCCH, the PUCCH resource to be used cannot be determined by using the PRI in the PDCCH, and high-layer signaling can be used to configure the dedicated PUCCH resource transmission for the SPS PDSCH. In R15, only one SPS transmission can be configured for one UE. Considering that a PUCCH supports at most one HARQ-ACK of the SPS PDSCH, the PUCCH resource configured for SPS transmission can use PUCCH format 0 or PUCCH format 1, and configuring only one PUCCH resource can meet the requirements. In R16, a plurality of SPS transmissions can be configured for one UE, and HARQ-ACKs of the plurality of SPS transmissions may be multiplexed for transmission in the same PUCCH. Therefore, the PUCCH resources configured for SPS can also use PUCCH formats 2, 3 and 4, and a plurality of PUCCH resources for SPS HARQ-ACK transmission can be configured.

Two configuration methods are provided for the slot structure in NR, and one of them is semi-static configuration, in which RRC signaling configures the slots included in a period and the transmission direction of each symbol in the slots in a periodic manner, which can be uplink (DL) symbol, downlink (UL) symbol and flexible (FL) symbol. In addition, the terminal can also be configured to detect DCI format 2-0 scrambled using SFI-RNTI, and the SFI information in the DCI can be used to dynamically change the transmission direction of symbols semi-statically configured as flexible to uplink or downlink. There are some provisions as follows.

In case that the detection for DCI format 2-0 scrambled using SFI-RNTI is configured, the transmission is performed according to the indication of DCI format 2-0, and the PUCCH resource corresponding to the HARQ-ACK of the SPS PDSCH can only be transmitted on the UL symbol indicated by the DCI format 2-0. In case that there is a semi-static DL symbol, or a symbol scheduled for downlink transmission by DCI, or a symbol indicated by DCI format 2-0 as DL or flexible in the symbol set where the PUCCH is located, the PUCCH is discarded and cannot be transmitted.

In case that the detection for DCI format 2-0 scrambled using SFI-RNTI is not configured, transmission is performed according to the semi-statically configured transmission direction and DCI scheduling. The PUCCH resource corresponding to the HARQ-ACK of the SPS PDSCH can be transmitted on the semi-statically configured symbol of UL or flexible. The flexible symbol can be used only in case that there is no downlink transmission scheduled by DCI (such as PDSCH, PDCCH, CSI-RS) and no SSB transmission, otherwise it is considered to conflict with DL transmission, and then the flexible symbol is also unavailable. In case that a PUCCH resource carrying HARQ-ACK of SPS PDSCH conflicts with a semi-statically configured DL symbol, or a flexible symbol with downlink transmission scheduled by DCI, or a symbol occupied by SSB, the PUCCH is discarded and cannot be transmitted.

In NR Rel-16, an SPS PDSCH transmission having a shorter period needs to be defined. For TDD scenarios, since only one K1 value can be indicated in the activated DCI of the SPS PDSCH, there may be a conflict between the PUCCH resource corresponding to the HARQ-ACK feedback of the SPS PDSCH in some transmission opportunities with a DL symbol or an unavailable flexible symbol (such as a flexible symbol indicated by SFI as DL or flexible, and a flexible symbol with downlink transmission scheduled by DCI), which will causes the HARQ feedback of short-period SPS PDSCH transmission to be discarded too much. In case that using deferred feedback or configuring different K1 values for different SPS transmission opportunities to ensure that each SPS PDSCH has a valid feedback position, embodiments of the present application provide the following solutions regarding how to support multiplexing transmission of SPS HARQ-ACK and dynamic HARQ-ACK in the same uplink channel to solve the problem that the transmission position of SPS PDSCH may not be included in the HARQ-ACK codebook.

Figure 2:
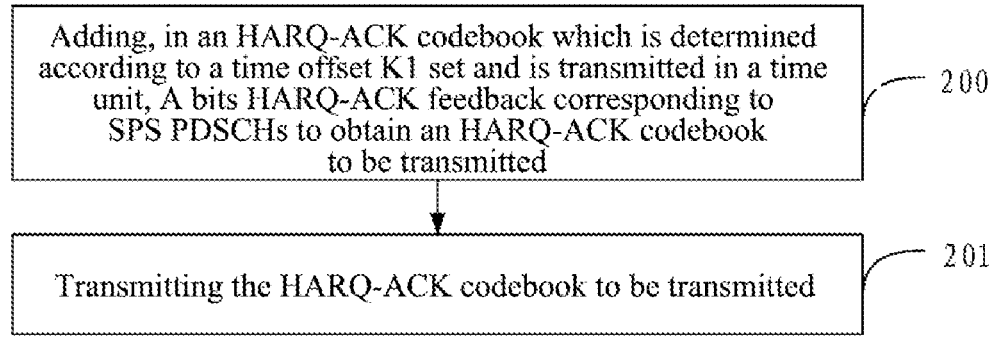
FIG. 2 is a schematic flowchart of an HARQ feedback method according to an embodiment of the present application.

FIG. 2 is a schematic flowchart of a HARQ feedback method according to an embodiment of the present application. As shown in FIG. 2, an execution subject of the method can be a terminal. The method specifically includes:

Step 200, in an HARQ-ACK codebook which is determined according to a time offset K1 set and is transmitted in a time unit, adding A bits HARQ-ACK feedback corresponding to SPS PDSCHs to obtain an HARQ-ACK codebook to be transmitted; where the A satisfies preset conditions that the A is a number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set.

In NR Rel-15 and Rel-16, the terminal needs to make HARQ-ACK feedback on the reception of the SPS PDSCH sent by the network side such as a base station. Under one SPS PDSCH configuration, the time offset K1 between the SPS PDSCH transmission and the corresponding HARQ-ACK feedback position can be only one K1 value indicated by activated DCI or configured by higher layer signaling. In order to clearly introduce the embodiments of the present application, slot offset will be taken as an example for description in each embodiment of the present application. Correspondingly, a time offset K1 is a slot offset K1, and the slot offset K1 is a value belonging to a K1 set. It can be understood that the K1 set can include several K1 values, and a certain K1 in the K1 set can be configured for one SPS PDSCH as the slot offset between the SPS PDSCH transmission and the corresponding HARQ-ACK feedback position.

The terminal will obtain an HARQ-ACK codebook determined according to the K1 set and transmitted in a time unit based on the related art. The time unit described in the embodiments of the present application can be any time resource, for example, a slot or a sub-slot, etc. In the embodiments of the present application, in order to clearly introduce the embodiments of to the present application, the slot is used as the time unit as example is introduced. For a certain target slot, in case that a symbol of the target slot is an uplink symbol, the HARQ-ACK feedback can be performed through the target slot. The terminal can determine a slot set corresponding to the target slot according to the K1 set, and the slots included in the slot set corresponding to the target slot satisfy the following conditions: downlink transmissions in these slots can realize HARQ-ACK feedback in the target slot by selecting a K1 value in the K1 set. It can be understood that the HARQ-ACK feedback corresponding to each slot in the slot set corresponding to the target slot is included in the HARQ-ACK codebook which is determined according to the K1 set and is transmitted in the target slot.

However, in case that a delay is needed, or it is determined that HARQ-ACK feedback needs to be performed in the target slot by a K1 value that do not belong to the K1 set, because the previously obtained HARQ-ACK codebook determined according to the K1 set and transmitted in the target slot does not include the HARQ-ACK feedback position corresponding to the SPS PDSCH transmission in one or some slots (for example, these slots are the slots which need to be deferred or where the SPS PDSCH transmissions, which feedback HARQ-ACK in the target slot determined by a K1 value that does not belong to the K1 set, are located), in the embodiments of the present application, in order to make the HARQ-ACK feedback corresponding to the SPS PDSCH transmission in this type of slot can be correctly received by the base station, the previously obtained HARQ-ACK codebook determined according to the K1 set and transmitted in the target slot should be adjusted. Specifically, A bits HARQ-ACK feedback corresponding to these SPS PDSCHs can be added in the HARQ-ACK codebook to obtain a HARQ-ACK codebook to be transmitted.

The A satisfies the following preset conditions: the A is the number of SPS PDSCHs in slots that do not belong to a slot set determined based on the K1 set and corresponding to the target slot, and the SPS PDSCH is an SPS PDSCH that is deferred, or is determined to feed back HARQ-ACK in the target slot based on a K1 value that does not belong to the K1 set. Assuming that there are 3 downlink slots (slot n, slot DL and slot n+2) before the target slot (n+3), based on the K1 set of {1,2}, it can be determined that the slot set where the downlink transmission corresponding to slot n+3 is located includes slot n+1 and slot n+2, namely according to the related art, the HARQ-ACK codebook in slot n+3 only includes HARQ-ACKs of downlink transmissions (such as PDSCH and PDCCH indicating the downlink SPS resource to release) in corresponding slots n+1 and n+2, but cannot include HARQ-ACK feedback of downlink transmission in slots other than these slots; the slot n does not belong to this slot set, namely in case that there is a downlink transmission in slot n feedback HARQ-ACK in slot n+3, it is not determined according to a certain K1 in the K1 set that the HARQ-ACK feedback needs to be performed in slot n+3, but it is determined either after a delay or based on a K1 value (such as 3) that does not belong to the K1 set that the HARQ-ACK feedback needs to be performed in slot n+3; therefore, the corresponding HARQ-ACK feedback cannot be included in the HARQ-ACK codebook determined based on the K1 set in the slot n+3, and additional HARQ-ACK feedback information for such SPS PDSCH needs to be added in the HARQ-ACK codebook determined based on the K1 set in slot n+3. In this example, the number of SPS PDSCH whose HARQ-ACK isn't in the HARQ-ACK codebook determined based on the K1 set in slot n+3 is 1, thus the value of A is 1, and in case that there is still a SPS PDSCH transmission in slot n−1 after HARQ-ACK delay or it is determined that HARQ-ACK feedback needs to be performed in slot n+3 based on a K1 value (such as 4) that does not belong to the K1 set, then the value of A is 2.

After the value of A is determined, in order to ensure that the HARQ-ACK codebook transmitted in slot n+3 includes the HARQ-ACK feedback corresponding to the SPS PDSCH in slot n, in an embodiment of the present application, 1 bit is added to the previously obtained HARQ-ACK codebook determined based on the K1 set and transmitted in the slot n+3, which is used to carry the HARQ-ACK feedback corresponding to the slot n, such that in case that the SPS PDSCH is deferred, or determined to feed back HARQ-ACK in the target slot based on a K1 value that does not belong to the K1 set, the HARQ-ACK of the SPS PDSCH is prevented from being discarded. This is because the adjusted HARQ-ACK codebook includes not only the HARQ-ACK corresponding to the possible PDSCH transmission positions in slot n+1 and slot n+2, but also the HARQ-ACK corresponding to the SPS PDSCH in slot n.

Step 201, transmitting the HARQ-ACK codebook to be transmitted.

After obtaining the adjusted HARQ-ACK codebook, the terminal transmits the HARQ-ACK codebook to the network side, for instance, to a base station. After receiving the adjusted HARQ-ACK codebook, the base station can obtain the added A bits HARQ-ACK corresponding to the SPS DPSCH from the codebook (it can be determined, according to the HARQ-ACK delay or K1 value consistent with the terminal side, which SPS PDSCH it corresponds to), to make a decision on whether to perform retransmission scheduling for the corresponding SPS PDSCH based on its corresponding HARQ-ACK.

According to the HARQ feedback method provided by the embodiments of the present application, in case that the SPS PDSCH is deferred, or is determined to feed back HARQ-ACK in a time unit based on a K1 value not belonging to a K1 set, the HARQ-ACK of the SPS PDSCH needs to be added in the HARQ-ACK codebook determined based on the K1 set and corresponding to the time unit, so that correct HARQ-ACK transmission is ensured, and the HARQ-ACK of the SPS PDSCH is prevented from being discarded.

Further, based on the foregoing method embodiment, the A bits HARQ-ACK corresponding to the SPS PDSCHs is concatenated at the beginning or end of the HARQ-ACK codebook. Specifically, in case that adding A bits HARQ-ACK feedback corresponding to the SPS PDSCH in the HARQ-ACK codebook determined based on the K1 set and transmitted in a time unit, the A bits can be concatenated at the first or last position of the HARQ-ACK codebook, or other feasible positions, as long as the base station can correctly parse and obtain the HARQ-ACK feedback of the A bits, and the specific position of the A bits is not defined in the embodiments of the present application.

Further, based on the foregoing method embodiments, the HARQ-ACK codebook is a dynamic or semi-static HARQ-ACK codebook. In one embodiment, for a semi-static HARQ-ACK codebook, the HARQ-ACK codebook is obtained by the terminal in the following manner:

determining a corresponding HARQ-ACK codebook based on the K1 set for each carrier, adding the HARQ-ACKs of the SPS PDSCHs transmitted in the carrier and satisfying the preset conditions in the HARQ-ACK codebook corresponding to each carrier to obtain a concatenated HARQ-ACK codebook corresponding to each carrier, where a sum of the number of HARQ-ACKs of the SPS PDSCHs added in the HARQ-ACK codebook corresponding to each carrier is A; and concatenating the concatenated HARQ-ACK codebooks corresponding to each carrier in the sequence of carrier indexes to obtain the HARQ-ACK codebook to be transmitted.

Specifically, for the semi-static HARQ-ACK codebook, the corresponding HARQ-ACK codebook for each carrier can be determined based on the K1 set, and for each carrier c, the HARQ-ACK of the SPS PDSCH transmitted in the carrier c and satisfying the above-mentioned preset conditions is added in the HARQ-ACK codebook corresponding to the carrier c to obtain the concatenated HARQ-ACK codebook corresponding to the carrier c. It can be understood that the value of a sum of the number of HARQ-ACKs of the SPS PDSCHs added in the HARQ-ACK codebook corresponding to each carrier c is A. Then, the concatenated HARQ-ACK codebooks corresponding to each carrier are concatenated together according to a certain order, such as the sequence of carrier indexes, to obtain the final HARQ-ACK codebook to be transmitted.

Further, based on the foregoing method embodiments, the HARQ-ACK codebook is a dynamic or semi-static HARQ-ACK codebook. Alternatively, for a semi-static HARQ-ACK codebook, the HARQ-ACK codebook is obtained by the terminal in the following manner:

determining a corresponding HARQ-ACK codebook based on the K1 set for each carrier, concatenating the HARQ-ACK codebooks corresponding to each carrier to obtain an HARQ-ACK codebook of a plurality of carriers; and determining HARQ-ACKs of A SPS PDSCHs transmitted in all carriers and satisfying the preset conditions, and concatenating that with the HARQ-ACK codebook of the plurality of carriers to obtain the HARQ-ACK codebook to be transmitted.

Specifically, for the semi-static HARQ-ACK codebook, it is also possible to firstly determine the corresponding HARQ-ACK codebook for each carrier based on the K1 set, and concatenate the HARQ-ACK codebooks corresponding to each carrier to obtain the HARQ-ACK codebook of the plurality of carriers; then, the HARQ-ACKs of A SPS PDSCHs transmitted in all carriers and satisfying the preset conditions are determined, namely the A bits HARQ-ACK feedback corresponding to the SPS PDSCH is concatenated with the HARQ-ACK codebook of the plurality of carriers to obtain the final HARQ-ACK codebook to be transmitted.

Further, based on the foregoing method embodiments, the A bits HARQ-ACK corresponding to the SPS PDSCHs is ordered according to at least one of a number of corresponding HARQ processes, an index of corresponding SPS configurations, an order of frequency domain positions and an order of time domain positions of the A SPS PDSCH transmissions.

As an illustration, the sequence of time domain first and frequency domain second can be adopted. For instance, carrier 1 and carrier 2 have a SPS PDSCH that satisfies the conditions in slots n and n+1, respectively, then the order of the A bits HARQ-ACK corresponding to these SPS PDSCHs is: SPS PDSCH in slot n of carrier 1, SPS PDSCH in slot n+1 of carrier 1, SPS PDSCH in slot n of carrier 2, SPS PDSCH in slot n+1 of carrier 2.

As another illustration, the sequence of frequency domain first and time domain second can be adopted. For instance, carrier 1 and carrier 2 have a SPS PDSCH that satisfies the conditions in slots n and n+1, respectively, then the order of the A bits HARQ-ACK corresponding to these SPS PDSCHs is: SPS PDSCH in slot n of carrier 1, SPS PDSCH in slot n of carrier 2, SPS PDSCH in slot n+1 of carrier 1, SPS PDSCH in slot n+1 of carrier 2.

According to the HARQ feedback method provided by the embodiments of the present application, in case that the SPS PDSCH is deferred, or is determined to feed back HARQ-ACK in a time unit based on a K1 value not belonging to a K1 set, the HARQ-ACK of the SPS PDSCH needs to be added in the HARQ-ACK codebook determined based on the K1 set and corresponding to the time unit, so that correct HARQ-ACK transmission is ensured, and the HARQ-ACK of the SPS PDSCH is prevented from being discarded.

Figure 3:
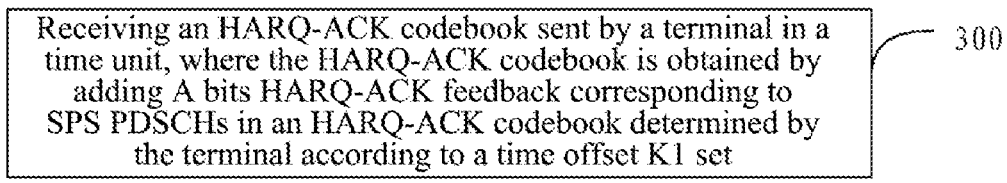
FIG. 3 is a schematic flowchart of an HARQ feedback method according to another embodiment of the present application.

FIG. 3 is a schematic flowchart of an HARQ feedback method according to another embodiment of the present application. As shown in FIG. 3, the execution subject of the method can be a base station, and specifically the method includes:

Step 300, receiving an HARQ-ACK codebook sent by a terminal in a time unit, where the HARQ-ACK codebook is obtained by adding A bits HARQ-ACK feedback corresponding to SPS PDSCHs in an HARQ-ACK codebook determined by the terminal according to a time offset K1 set; and where, the A satisfies preset conditions that the A is the number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set.

Specifically, in NR Rel-15 and Rel-16, the terminal needs to make HARQ-ACK feedback on the reception of the SPS PDSCH sent by the base station, and the terminal specifically feeds back to the base station through a HARQ-ACK codebook. The time unit can include slots or sub-slots, as previously described, in case that there is a need to delay, or it is determined by a K1 value that does not belong to the K1 set that HARQ-ACK feedback needs to be performed in a target slot, because the previously obtained HARQ-ACK codebook determined based on the K1 set and transmitted in the target slot does not include the HARQ-ACK feedback position corresponding to one or some slots (it can be understood that these slots are the slots that need to be deferred or are the slots determined by K1 values that do not belong to the K1 set to feed back HARQ-ACK in the target slot), in the embodiments of the present application, in order to enable the HARQ-ACK feedback corresponding to this type of slot to be correctly received by the base station, the terminal needs to adjust the previously obtained HARQ-ACK codebook determined based on the K1 set and transmitted in the target slot; and specifically, the terminal adds A bits HARQ-ACK feedback corresponding to the SPS PDSCH in the HARQ-ACK codebook to obtain the HARQ-ACK codebook to be transmitted. After the terminal transmits the adjusted HARQ-ACK codebook to the base station, the base station receives the HARQ-ACK codebook in the corresponding target slot.

After receiving the adjusted HARQ-ACK codebook, the base station can obtain the added A bits HARQ-ACK corresponding to the SPS DPSCH from the codebook, to make a decision on whether to perform retransmission scheduling for the corresponding PDSCH based on its corresponding HARQ-ACK. Please refer to the description about how the terminal adjusts the HARQ-ACK codebook in the above-mentioned method embodiments, and details are not repeated here.

According to the HARQ feedback method provided by the embodiments of the present application, in case that the SPS PDSCH is deferred, or is determined to feed back HARQ-ACK in a time unit based on a K1 value not belonging to a K1 set, the HARQ-ACK of the SPS PDSCH needs to be added in the HARQ-ACK codebook determined based on the K1 set and corresponding to the time unit, so that correct HARQ-ACK transmission is ensured, and the HARQ-ACK of the SPS PDSCH is prevented from being discarded.

Further, based on the foregoing method embodiments, the A bits HARQ-ACK corresponding to the SPS PDSCHs is concatenated at the beginning or end of the HARQ-ACK codebook. Specifically, in case that adding A bits HARQ-ACK feedback corresponding to the SPS PDSCH in the HARQ-ACK codebook determined based on the K1 set and transmitted in a time unit, the A bits can be concatenated at the first or last position of the HARQ-ACK codebook, or other feasible positions, as long as the base station can correctly parse and obtain the HARQ-ACK feedback of the A bits, and the specific position is not defined in the embodiments of the present application.

Further, based on the foregoing method embodiments, the HARQ-ACK codebook is a dynamic or semi-static HARQ-ACK codebook. In one embodiment, for a semi-static HARQ-ACK codebook, the terminal adding A bits HARQ- ACK feedback corresponding to SPS PDSCHs to obtain an HARQ-ACK codebook to be transmitted includes:

determining a corresponding HARQ-ACK codebook based on the K1 set for each carrier, adding the HARQ-ACKs of the SPS PDSCHs transmitted in the carrier and satisfying the preset conditions in the HARQ-ACK codebook corresponding to each carrier to obtain the concatenated HARQ-ACK codebook corresponding to each carrier, where a sum of the number of HARQ-ACKs of the SPS PDSCH added in the HARQ-ACK codebook corresponding to each carrier is A; and concatenating the concatenated HARQ-ACK codebooks corresponding to each carrier in the sequence of carrier indexes to obtain the HARQ-ACK codebook to be transmitted.

Specifically, for the semi-static HARQ-ACK codebook, the corresponding HARQ-ACK codebook for each carrier can be determined based on the K1 set, and for each carrier, the HARQ-ACK of the SPS PDSCH transmitted on the carrier and satisfying the above-mentioned preset conditions is added in the HARQ-ACK codebook corresponding to the carrier to obtain the concatenated HARQ-ACK codebook corresponding to the carrier. It can be understood that the value of a sum of the number of HARQ-ACKs of the SPS PDSCHs added in the HARQ-ACK codebook corresponding to each carrier is A. Then, the concatenated HARQ-ACK codebooks corresponding to each carrier are concatenated together according to a certain order, such as the order of carrier indexes, to obtain the final HARQ-ACK codebook to be transmitted.

Further, based on the foregoing method embodiments, the HARQ-ACK codebook is a dynamic or semi-static HARQ-ACK codebook. Alternatively, for the semi-static HARQ-ACK codebook, the terminal adding A bits HARQ-ACK feedback corresponding to SPS PDSCHs to obtain an HARQ-ACK codebook to be transmitted includes:

determining a corresponding HARQ-ACK codebook based on the K1 set for each carrier, concatenating the HARQ-ACK codebooks corresponding to each carrier to obtain the HARQ-ACK codebook of a plurality of carriers; and determining HARQ-ACKs of A SPS PDSCHs transmitted in all carriers and satisfying the preset conditions, and concatenating that with the HARQ-ACK codebook of the plurality of carriers to obtain the HARQ-ACK codebook to be transmitted.

Specifically, for the semi-static HARQ-ACK codebook, it is also possible to firstly determine the corresponding HARQ-ACK codebook for each carrier based on the K1 set, and concatenate the HARQ-ACK codebooks corresponding to each carrier to obtain the HARQ-ACK codebook of the plurality of carriers; then, the HARQ-ACKs of A SPS PDSCHs transmitted in all carriers and satisfying the preset conditions are determined, namely the A bits HARQ-ACK feedback corresponding to the SPS PDSCH is concatenated with the HARQ-ACK codebook of the plurality of carriers to obtain the final HARQ-ACK codebook to be transmitted.

Further, based on the foregoing method embodiments, the A bits HARQ-ACK corresponding to the SPS PDSCHs is ordered according to a number of corresponding HARQ processes, an index of corresponding SPS configurations, an order of frequency domain positions and an order of time domain positions of A SPS PDSCH transmissions.

As an illustration, the sequence of time domain first and frequency domain second can be adopted. For instance, carrier 1 and carrier 2 have a SPS PDSCH that satisfies the conditions in slots n and n+1, respectively, then the order of the A bits HARQ-ACK corresponding to these SPS PDSCHs is as follows: SPS PDSCH in slot n of carrier 1, SPS PDSCH in slot n+1 of carrier 1, SPS PDSCH in slot n of carrier 2, SPS PDSCH in slot n+1 of carrier 2.

As another illustration, the sequence of frequency domain first and time domain second can be adopted. For instance, carrier 1 and carrier 2 have a SPS PDSCH that satisfies the conditions in slots n and n+1, respectively, then the order of the A bits HARQ-ACK corresponding to these SPS PDSCHs is as follows: SPS PDSCH in slot n of carrier 1, SPS PDSCH in slot n of carrier 2, SPS PDSCH in slot n+1 of carrier 1, SPS PDSCH in slot n+1 of carrier 2.

Based on the foregoing method embodiments, the base station can separate the HARQ-ACK codebook determined based on the K1 set and the added A bits HARQ-ACK corresponding to the SPS DPSCH from the codebook in a corresponding manner, so that a decision on whether to perform retransmission scheduling is made for the corresponding PDSCH based on its corresponding HARQ-ACK.

According to the HARQ feedback method provided by the embodiments of the present application, in case that the SPS PDSCH is deferred, or is determined to feed back HARQ-ACK in a time unit based on a K1 value not belonging to a K1 set, the HARQ-ACK of the SPS PDSCH needs to be added in the HARQ-ACK codebook determined based on the K1 set and corresponding to the time unit, so that correct HARQ-ACK transmission is ensured, and the HARQ-ACK of the SPS PDSCH is prevented from being discarded.

Figure 4:
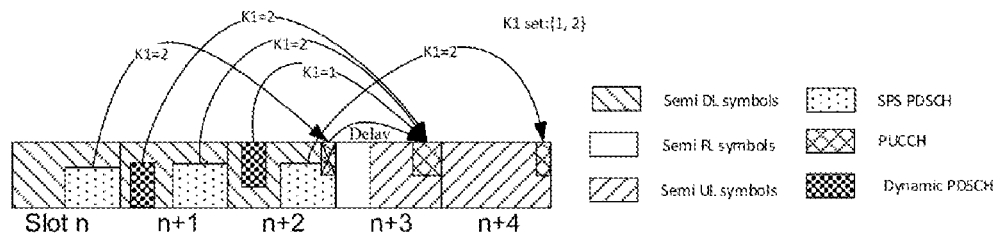
FIG. 4 is a schematic diagram of an HARQ-ACK feedback of SPS PDSCH according to an embodiment of the present application.

FIG. 4 is a schematic diagram of an HARQ-ACK feedback of SPS PDSCH according to an embodiment of the present application. As shown in FIG. 4, it is assumed that the base station configures an SPS transmission for the terminal, the period of the SPS PDSCH transmission is one slot, and the configured K1 set is {1,2}. In case that the value of K1 indicated in the DCI of the activated SPS PDSCH is 2, the HARQ-ACK feedback corresponding to the SPS PDSCH in slot n is in slot n+2; however, the slot n+2 is a downlink slot, and the PUCCH resource corresponding to the SPS PDSCH transmission is an invalid PUCCH resource, thus HARQ-ACK feedback needs to be deferred, for instance, deferred to slot n+3 for transmission, e.g., all the PUCCH resources corresponding to the HARQ-ACK of the SPS PDSCH in slot n+3 are semi-statically configured uplink symbols, thus they are valid PUCCH resources.

In case that there is dynamic HARQ-ACK feedback information in the slot n+3 (i.e., the HARQ-ACK corresponding to the PDSCH having the corresponding PDCCH or the PDCCH indicating the downlink SPS resources to release), the slot set corresponding to the slot n+3 is determined according to the K1 set (i.e., the downlink transmissions in these slots can feed back HARQ-ACK in the slot n+3 by selecting a value in the K1 set), that is, this slot set is the slot set obtained from slot n+3-K1, namely slot n+1 and slot n+2, excluding slot n; thus the HARQ-ACK codebook determined based on K1 does not include the HARQ-ACK feedback position of the SPS PDSCH in slot n, but only includes the HARQ-ACK feedback positions corresponding to the possible PDSCH transmission positions in slot n+1 and slot n+2. Therefore, it is necessary to add the HARQ-ACK feedback information corresponding to the SPS PDSCH in slot n in the HARQ-ACK codebook determined based on K1. Assuming that according to the current configuration, it is only determined that the SPS PDSCH in slot n needs to be deferred to slot n+3 to feed back HARQ-ACK, then 1 bit HARQ-ACK corresponding to the SPS PDSCH is added in the HARQ-ACK codebook determined based on the K1 set, for instance, added at the end to obtain the final HARQ-ACK feedback sequence to be transmitted.

In slot n+3, the base station transmits the obtained HARQ-ACK feedback sequence in the corresponding uplink channel, for instance, it can be transmitted through PUCCH or PUSCH.

Figure 5:
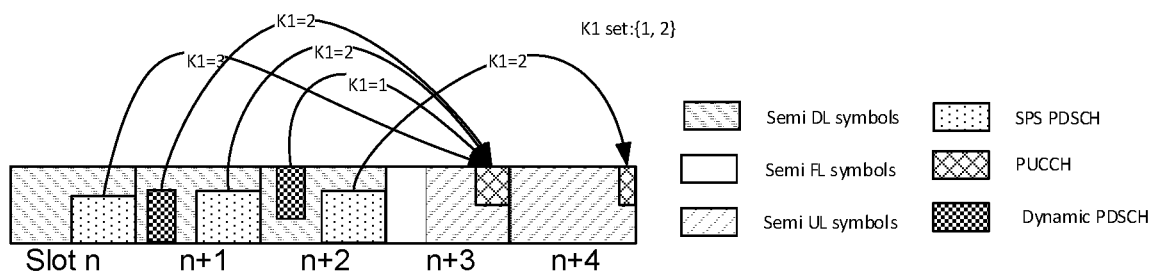
FIG. 5 is a schematic diagram of an HARQ-ACK feedback of SPS PDSCH according to another embodiment of the present application.

FIG. 5 is a schematic diagram of an HARQ-ACK feedback of SPS PDSCH according to another embodiment of the present application. As shown in FIG. 5, it is assumed that the base station configures an SPS transmission for the terminal, the period of the SPS PDSCH transmission is one slot, and the configured K1 set is {1,2}. According to the uplink and downlink configuration ratio and the SPS period, different K1 values are configured for the SPS PDSCH in different SPS transmission opportunities corresponding to the SPS configuration, so that the available PUCCH resources for transmitting its HARQ-ACK can be found. For instance, in case that K1=3 is configured for the SPS PDSCH in slot n, it is determined to transmit in slot n+3, and since the symbols where the corresponding PUCCH resources in slot n+3 are located are all uplinks, they are available; and in case that K1=2 is configured for the SPS PDSCH in slot n+1 and slot n+2, it is determined to transmit in slot n+3 and slot n+4 respectively, and since the symbols where the corresponding PUCCH resources in slot n+3 and slot n+4 are located are both uplinks, they are available.

As shown in FIG. 5, since the K1 set does not include the value of K1=3 corresponding to the SPS PDSCH in the slot n, in case that there is a dynamic HARQ-ACK feedback information (i.e., the HARQ-ACK corresponding to the PDSCH having the corresponding PDCCH or the PDCCH indicating the downlink SPS resources to release) in the slot n+3, the slot set corresponding to slot n+3 is determined based on the K1 set (i.e., the downlink transmission in these slots can feed back HARQ-ACK in slot n+3 by selecting a value in the K1 set), that is, the slot set obtained from the slot n+3−K1 is the slot n+1 and the slot n+2, excluding the slot n. Therefore, the HARQ-ACK codebook determined based on K1 does not include the HARQ-ACK feedback position of the SPS PDSCH in slot n, but only includes the HARQ-ACK feedback positions corresponding to the possible PDSCH transmission positions in slot n+1 and slot n+2. Therefore, it is necessary to add the HARQ-ACK feedback information corresponding to the SPS PDSCH in slot n in the HARQ-ACK codebook determined based on K1. Assuming that according to the current configuration, it is only determined that the SPS PDSCH in slot n needs to be deferred to slot n+3 to feed back HARQ-ACK, then 1 bit HARQ-ACK corresponding to the SPS PDSCH is added in the HARQ-ACK codebook determined based on the K1 set, for instance, added at the end to obtain the final HARQ-ACK feedback sequence to be transmitted.

In slot n+3, the base station transmits the above obtained HARQ-ACK feedback sequence in the corresponding uplink channel, for instance, it can be transmitted through PUCCH or PUSCH.

It should be noted that, only specific situations are taken as examples in the above-mentioned embodiments. After changing the relevant parameters, the methods provided in the embodiments of the present application are also applicable. For instance, the methods are applicable to the cases of changing the slot to a sub-slot, changing the SPS transmission period, changing the number of HARQ-ACKs that need to be fed back to the SPS PDSCH in the slot n+3, and changing the rules for judging whether PUCCH resources are available, etc.

Figure 6:
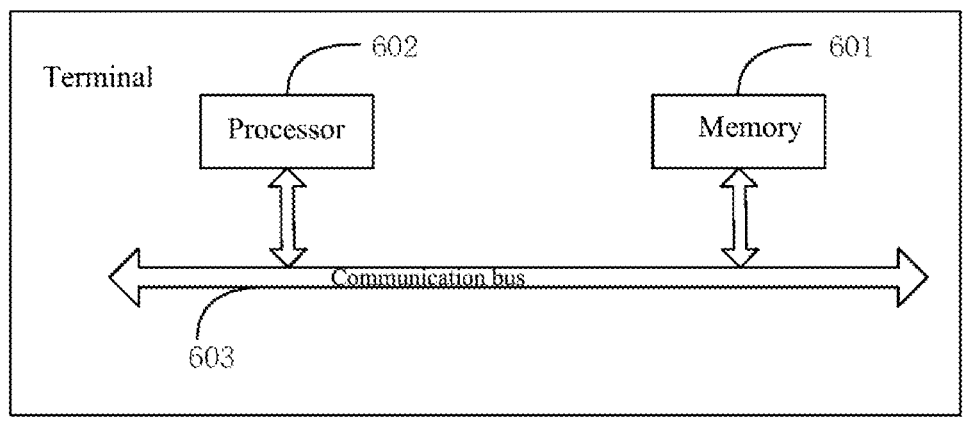
FIG. 6 is a schematic structural diagram of a terminal according to an embodiment of the present application.

FIG. 6 is a schematic structural diagram of a terminal according to an embodiment of the present application. As shown in FIG. 6, the terminal includes a memory 601, a processor 602, and programs stored in the memory 601 and executable in the processor 602, where the memory 601 and the processor 602 communicate with each other through a communication bus 603, and in case that the processor 602 executes the programs, the following steps are implemented:

in an HARQ-ACK codebook which is determined according to a time offset K1 set and is transmitted in a time unit, adding A bits HARQ-ACK feedback corresponding to SPS PDSCHs to obtain an HARQ-ACK codebook to be transmitted; where the A satisfies preset conditions that the A is a number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set; and transmitting the HARQ-ACK codebook to be transmitted.

Further, the A bits HARQ-ACK corresponding to the SPS PDSCHs is concatenated at the beginning or end of the HARQ-ACK codebook.

Further, the HARQ-ACK codebook is a dynamic or semi-static HARQ-ACK codebook.

Further, in case that the HARQ-ACK codebook is the semi-static HARQ-ACK codebook, the adding A bits HARQ-ACK feedback corresponding to SPS PDSCHs to obtain an HARQ-ACK codebook to be transmitted may include:

determining a corresponding HARQ-ACK codebook based on the K1 set for each carrier, adding the HARQ-ACKs of the SPS PDSCHs transmitted in the carrier and satisfying the preset conditions in the HARQ-ACK codebook corresponding to each carrier to obtain the concatenated HARQ-ACK codebook corresponding to each carrier, where a sum of the number of HARQ-ACKs of the SPS PDSCHs added in the HARQ-ACK codebook corresponding to each carrier is A; and concatenating the concatenated HARQ-ACK codebooks corresponding to each carrier in the sequence of carrier indexes to obtain the HARQ-ACK codebook to be transmitted.

Further, in case that the HARQ-ACK codebook is the semi-static HARQ-ACK codebook, correspondingly, the adding A bits HARQ-ACK feedback corresponding to SPS PDSCHs to obtain an HARQ-ACK codebook to be transmitted can include:

determining a corresponding HARQ-ACK codebook based on the K1 set for each carrier, concatenating the HARQ-ACK codebooks corresponding to each carrier to obtain the HARQ-ACK codebook of a plurality of carriers; and determining HARQ-ACKs of A SPS PDSCHs transmitted in all carriers and satisfying the preset conditions, concatenating that with the HARQ-ACK codebook of the plurality of carriers to obtain the HARQ-ACK codebook to be transmitted.

Further, the A bits HARQ-ACK corresponding to the SPS PDSCHs is ordered according to at least one of a number of corresponding HARQ processes, an index of corresponding SPS configurations, an order of frequency domain positions and an order of time domain positions of A SPS PDSCH transmissions.

Further, any of the time units is defined as slot and sub-slot.

In addition, the above-mentioned computer program in the memory 601 can be implemented in the form of software functional units and can be stored in a computer-readable storage medium in case that sold or used as an independent product. Thus, embodiments of the present application provide a computer software product, which is stored in a storage medium and includes several instructions for causing a computer device (e.g., a personal computer, a server, or a network device, etc.) to perform all or part of the steps of the methods described in the various embodiments of the present application. The aforementioned storage medium includes: USB flash disk, mobile hard disk, Read-Only Memory (ROM), Random Access Memory (RAM), magnetic disk, compact disk and other media that can store program codes.

The process of the method involved in performing the program by the processor 602 can refer to the above-mentioned method embodiments, which will not be repeated here.

Figure 7:
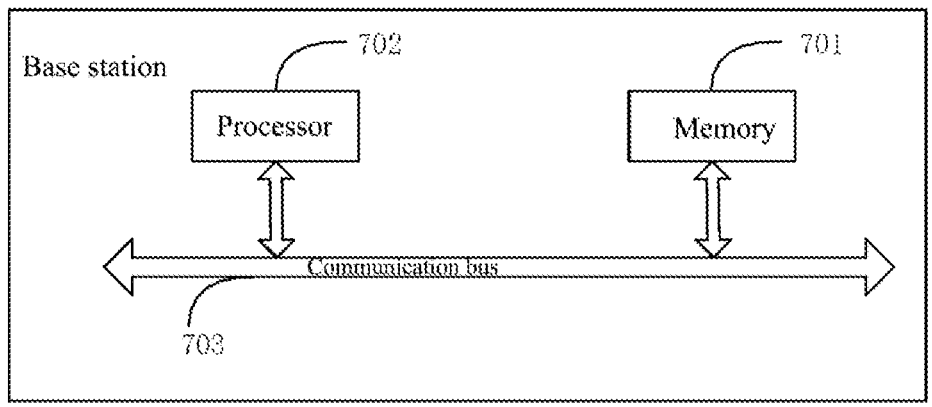
FIG. 7 is a schematic structural diagram of a base station according to an embodiment of the present application.

FIG. 7 is a schematic structural diagram of a base station according to an embodiment of the present application. As shown in FIG. 7, the base station includes a memory 701, a processor 702, and programs stored in the memory 701 and executable in the processor 702, where the memory 701 and the processor 702 communicate with each other through a communication bus 703, and in case that the processor 702 executes the programs, the following steps are implemented:

receiving an HARQ-ACK codebook sent by a terminal in a time unit, where the HARQ-ACK codebook is obtained by adding A bits HARQ-ACK feedback corresponding to the SPS PDSCH in an HARQ-ACK codebook determined according to a time offset K1 set by the terminal; and where, the A satisfies preset conditions that the A is the number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that do not belong to the K1 set.

Further, the A bits HARQ-ACK corresponding to the SPS PDSCHs is concatenated at the beginning or end of the HARQ-ACK codebook.

Further, the HARQ-ACK codebook is a dynamic or semi-static HARQ-ACK codebook.

Further, in case that the HARQ-ACK codebook is the semi-static HARQ-ACK codebook, correspondingly, the HARQ-ACK codebook is obtained by the terminal in the following manner:

determining a corresponding HARQ-ACK codebook based on the K1 set for each carrier, adding the HARQ-ACKs of the SPS PDSCHs transmitted in the carrier and satisfying the preset conditions in the HARQ-ACK codebook corresponding to each carrier to obtain the concatenated HARQ-ACK codebook corresponding to each carrier, where a sum of the number of HARQ-ACKs of the SPS PDSCHs added in the HARQ-ACK codebook corresponding to each carrier is A; and concatenating the concatenated HARQ-ACK codebooks corresponding to each carrier in the sequence of carrier indexes to obtain the HARQ-ACK codebook.

Further, in case that the HARQ-ACK codebook is the semi-static HARQ-ACK codebook, correspondingly, the HARQ-ACK codebook is obtained by the terminal in the following manner:

determining a corresponding HARQ-ACK codebook based on the K1 set for each carrier, concatenating the HARQ-ACK codebooks corresponding to each carrier to obtain the HARQ-ACK codebook of a plurality of carriers; and determining HARQ-ACKs of A SPS PDSCHs transmitted in all carriers and satisfying the preset conditions, concatenating the A bits HARQ-ACKs with the HARQ-ACK codebook of the plurality of carriers to obtain the HARQ-ACK codebook.

Further, the A bits HARQ-ACK corresponding to the SPS PDSCHs is ordered according to at least one of a number of corresponding HARQ processes, an index of corresponding SPS configurations, an order of frequency domain positions and an order of time domain positions of A SPS PDSCH transmissions.

Further, any of the time units is defined as slot and sub-slot.

In addition, the above-mentioned computer program in the memory 701 can be implemented in the form of software functional units and can be stored in a computer-readable storage medium in case that sold or used as an independent product. Thus, embodiments of the present application provide a computer software product, which is stored in a storage medium and includes several instructions for causing a computer device (e.g., a personal computer, a server, or a network device, etc.) to perform all or part of the steps of the methods described in the various embodiments of the present application. The aforementioned storage medium includes: USB flash disk, mobile hard disk, Read-Only Memory (ROM), Random Access Memory (RAM), magnetic disk, compact disk and other media that can store program codes.

The process of the method involved in performing the program by the processor 702 can refer to the above-mentioned method embodiments, which will not be repeated here.

Figure 8:
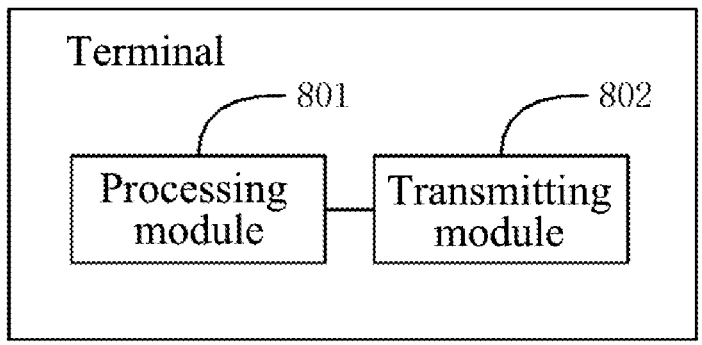
FIG. 8 is a schematic structural diagram of a terminal according to another embodiment of the present application.

FIG. 8 is a schematic structural diagram of a terminal according to another embodiment of the present application. As shown in FIG. 8, the terminal includes a processing module 801 and a transmitting module 802, in which:

the processing module 801 is configured to add, in an HARQ-ACK codebook which is determined according to a time offset K1 set and is transmitted in a time unit, A bits HARQ-ACK feedback corresponding to SPS PDSCHs to obtain an HARQ-ACK codebook to be transmitted; where the A satisfies preset conditions that the A is the number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set; and the transmitting module 802 is configured to transmit the HARQ-ACK codebook to be transmitted.

The terminal provided by the embodiments of the present application is specifically configured to perform the HARQ feedback method provided by the above method embodiments, and the specific functions and procedures of the terminal can be referred to in the above-mentioned method embodiments, which will not be repeated here.

Figure 9:
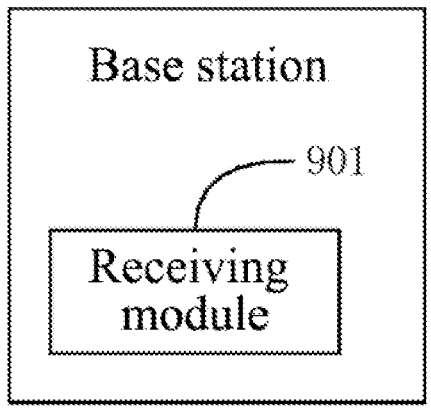
FIG. 9 is a schematic structural diagram of a base station according to another embodiment of the present application.

FIG. 9 is a schematic structural diagram of a base station according to another embodiment of the present application. As shown in FIG. 9, the base station includes a receiving module 901, configured to receive an HARQ-ACK codebook sent by a terminal in a time unit, where the HARQ-ACK codebook is obtained by adding A bits HARQ-ACK feedback corresponding to the SPS PDSCH in an HARQ-ACK codebook determined according to a time offset K1 set by the terminal; in which the A satisfies preset conditions that the A is the number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set.

The base station provided by the embodiments of the present application is specifically configured to perform the HARQ feedback method provided by the above method embodiments, and the specific functions and procedures of the base station can be referred to in the above-mentioned method embodiments, which will not be repeated here.

According to the terminal and base station provided by the embodiments of the present application, in case that the SPS PDSCH is deferred, or is determined to feed back HARQ-ACK in a time unit based on a K1 value not belonging to a K1 set, the HARQ-ACK of the SPS PDSCH needs to be added in the HARQ-ACK codebook determined based on the K1 set and corresponding to the time unit, so that correct HARQ-ACK transmission is ensured, and the HARQ-ACK of the SPS PDSCH is prevented from being discarded.

An embodiment of the present application further provides a non-transitory computer-readable storage medium, having computer programs stored therein, where in case that the computer programs are executed by a processor, the methods provided by the above various embodiments are performed, for instance, including: in an HARQ-ACK codebook which is determined according to a time offset K1 set and is transmitted in a time unit, adding A bits HARQ-ACK feedback corresponding to SPS PDSCHs to obtain an HARQ-ACK codebook to be transmitted; where the A satisfies preset conditions that the A is the number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set; and transmitting the HARQ-ACK codebook to be transmitted.

An embodiment of the present application further provides another non-transitory computer-readable storage medium, having computer programs stored therein, where in case that the computer programs are executed by a processor, the methods provided by the above various embodiments are performed, for instance, including: receiving an HARQ-ACK codebook sent by a terminal in a time unit, where the HARQ-ACK codebook is obtained by adding A bits HARQ-ACK feedback corresponding to the SPS PDSCH in an HARQ-ACK codebook determined according to a time offset K1 set by the terminal; in which the A satisfies preset conditions that the A is the number of SPS PDSCHs in time units that do not belong to a time unit set determined based on the K1 set and corresponding to the time unit, and the SPS PDSCH is an SPS PDSCH that is determined to feed back HARQ-ACK in the time unit or is determined to feed back HARQ-ACK in the time unit based on a K1 value that does not belong to the K1 set.

The non-transitory computer-readable storage mediums provided by the embodiments of the present application is specifically configured to perform the HARQ feedback method provided by the above method embodiments, and the specific functions and procedures of the storage mediums can be referred to in the above-mentioned method embodiments, which will not be repeated here.

The above-mentioned device embodiments are only illustrative, and the units described as separate components may or may not be physically separated, and the components shown as units may or may not be physical units, namely they may be either located in one place, or distributed to multiple network elements. Some or all of the modules may be selected according to actual needs to achieve the objectives of the solutions in the embodiments.

From the description of the above-mentioned embodiments, each embodiment can be implemented by means of software plus a necessary general hardware platform, and certainly can also be implemented by hardware. Based on such understanding, an embodiment of the present application provides a computer software product, which can be stored in a computer-readable storage medium, such as ROM/RAM, magnetic disk, compact disk, and may include several instructions for causing a computer device (which can be a personal computer, a server, a network device and the like) to execute the methods described in various embodiments or portions of embodiments.

What is claimed is:

1. A hybrid automatic repeat request (HARQ) feedback method for semi-persistent scheduling (SPS) physical downlink shared channel (PDSCH) with shorter periodicity, comprising:
    adding, in an HARQ-acknowledgement (ACK) codebook which is determined according to a time offset K1 set and is transmitted in a first time unit, A bits HARQ-ACK feedback corresponding to SPS PDSCHs to obtain another HARQ-ACK codebook to be transmitted, wherein the A satisfies preset conditions that the A is a number of SPS PDSCHs in time units that do not belong to a time unit set determined based on the K1 set and corresponding to the first time unit, and the SPS PDSCH is an SPS PDSCH that is deferred to feed back HARQ-ACK in the first time unit or is determined to feed back HARQ-ACK in the first time unit based on a K1 value that does not belong to the K1 set; and
    transmitting the another HARQ-ACK codebook to be transmitted.

2. The method of claim 1, wherein the A bits HARQ-ACK corresponding to the SPS PDSCHs are concatenated at beginning or end of the HARQ-ACK codebook, and/or the A bits HARQ-ACK corresponding to the SPS PDSCHs are ordered according to at least one of a number of corresponding HARQ processes, an index of corresponding SPS configurations, an order of frequency domain positions and an order of time domain positions of A SPS PDSCH transmissions.

3. The method of claim 1, wherein the HARQ-ACK codebook is a dynamic or semi-static HARQ-ACK codebook.

4. The method of claim 3, wherein in case that the HARQ-ACK codebook is the semi-static HARQ-ACK codebook, the adding A bits HARQ-ACK feedback corresponding to SPS PDSCHs to obtain another HARQ-ACK codebook to be transmitted comprises:

determining a corresponding HARQ-ACK codebook based on the K1 set for each carrier, adding the HARQ-ACKs of SPS PDSCHs transmitted in the carrier and satisfying the preset conditions in the corresponding HARQ-ACK codebook of each carrier to obtain a corresponding concatenated HARQ-ACK codebook of each carrier, wherein a sum of the number of HARQ-ACKs of the SPS PDSCHs added in the HARQ-ACK codebook corresponding to each carrier is equal to A; and obtaining the another HARQ-ACK codebook to be transmitted by concatenating the corresponding concatenated HARQ-ACK codebooks of each carrier according to an order of carrier index; or in case that the HARQ-ACK codebook is the semi-static HARQ-ACK codebook, the adding A bits HARQ-ACK feedback corresponding to SPS PDSCHs to obtain another HARQ-ACK codebook to be transmitted comprises:

determining a corresponding HARQ-ACK codebook based on the K1 set for each carrier, and obtaining an HARQ-ACK codebook of a plurality of carriers by concatenating the corresponding HARQ-ACK codebooks of each carrier; and determining A bits HARQ-ACKs corresponding to SPS PDSCHs transmitted in all carriers and satisfying the preset conditions, and obtaining the another HARQ-ACK codebook to be transmitted by concatenating the A bits HARQ-ACKs with the HARQ-ACK codebook of the plurality of carriers.

5. The method of claim 1, wherein any of the time units is defined as slot or sub-slot.

6. A hybrid automatic repeat request (HARQ) feedback method for semi-persistent scheduling (SPS) physical downlink shared channel (PDSCH) with shorter periodicity, comprising:

receiving, in a first time unit, an HARQ-acknowledgement (ACK) codebook transmitted from a terminal, wherein the HARQ-ACK codebook is obtained by adding A bits HARQ-ACK feedback corresponding to SPS PDSCHs in another HARQ-ACK codebook determined according to a time offset K1 set by the terminal, wherein the A satisfies preset conditions that the A is a number of SPS PDSCHs in time units that do not belong to a time unit set determined based on the K1 set and corresponding to the first time unit, and the SPS PDSCH is an SPS PDSCH that is deferred to feed back HARQ-ACK in the first time unit or is determined to feed back HARQ-ACK in the first time unit based on a K1 value that does not belong to the K1 set.

7. The method of claim 6, wherein the A bits HARQ-ACK corresponding to the SPS PDSCHs are concatenated at beginning or end of the HARQ-ACK codebook, and/or the A bits HARQ-ACK corresponding to the SPS PDSCHs are ordered according to at least one of a number of corresponding HARQ processes, an index of corresponding SPS configurations, an order of frequency domain positions and an order of time domain positions of A SPS PDSCH transmissions.

8. The method of claim 6, wherein the HARQ-ACK codebook is a dynamic or semi-static HARQ-ACK codebook.

9. The method of claim 8, wherein in case that the HARQ-ACK codebook is the semi-static HARQ-ACK codebook, determining that the HARQ-ACK codebook is obtained by the terminal in the following manner:

determining a corresponding HARQ-ACK codebook based on the K1 set for each carrier, adding the HARQ-ACKs of the SPS PDSCHs transmitted in the carrier and satisfying the preset conditions in the corresponding HARQ-ACK codebook of each carrier to obtain a corresponding concatenated HARQ-ACK codebook of each carrier, wherein a sum of the number of HARQ-ACKs of the SPS PDSCHs added in the HARQ-ACK codebook corresponding to each carrier is equal to A; and obtaining the HARQ-ACK codebook by concatenating the corresponding concatenated HARQ-ACK codebooks of all carrier one after another according to an order of carrier indexes; or in case that the HARQ-ACK codebook is the semi-static HARQ-ACK codebook, determining that the HARQ-ACK codebook is obtained by the terminal in the following manner;

determining a corresponding HARQ-ACK codebook based on the K1 set for each carrier, and obtaining an HARQ-ACK codebook of a plurality of carriers by concatenating the corresponding HARQ-ACK codebooks of each carrier; and determining A bits HARQ-ACKs corresponding to SPS PDSCHs transmitted in all carriers and satisfying the preset conditions, and obtaining the HARQ-ACK codebook by concatenating the A bits HARQ-ACKs with the HARQ-ACK codebook of the plurality of carriers.

10. A base station, comprising a memory, a processor and programs stored in the memory and executable in the processor, wherein the programs, in case of being executed by the processor, cause the processor to perform steps of claim 6.

11. The base station of claim 10, wherein the A bits hybrid automatic repeat request (HARQ) acknowledgement (ACK) HARQ ACK-corresponding to the semi-persistent scheduling (SPS) physical downlink shared channels (PDSCHs) are concatenated at beginning or end of the HARQ-ACK codebook, and/or the A bits HARQ-ACK corresponding to the SPS PDSCHs are ordered according to at least one of a number of corresponding HARQ processes, an index of corresponding SPS configurations, an order of frequency domain positions and an order of time domain positions of A SPS PDSCH transmissions.

12. The base station of claim 10, wherein the HARQ-ACK codebook is a dynamic or semi-static HARQ-ACK codebook.

13. The base station of claim 12, wherein in case that the HARQ-ACK codebook is the semi-static HARQ-ACK codebook, determining the HARQ-ACK codebook is obtained by the terminal in the following manner:

determining a corresponding HARQ-ACK codebook based on the K1 set for each carrier, adding the HARQ-ACKs of SPS PDSCHs transmitted in the carrier and satisfying the preset conditions in the corresponding HARQ-ACK codebook of each carrier to obtain a corresponding concatenated HARQ-ACK codebook of each carrier, wherein a sum of the number of HARQ-ACKs of the SPS PDSCHs added in the HARQ-ACK codebook corresponding to each carrier is equal to A; and obtaining the HARQ-ACK codebook by concatenating the corresponding concatenated HARQ-ACK codebooks of all carrier one after another according to an order carrier indexes; or in case that the HARQ-ACK codebook is the semi-static HARQ-ACK codebook, determining the HARQ-ACK codebook is obtained by the terminal in the following manner:
determining a corresponding HARQ-ACK codebook based on the K1 set for each carrier, and obtaining an HARQ-ACK codebook of a plurality of carriers by concatenating the corresponding HARQ-ACK codebooks of each carrier; and
determining A bits HARQ-ACKs corresponding to SPS PDSCHs transmitted in all carriers and satisfying the preset conditions, and obtaining the HARQ-ACK codebook by concatenating the A bits HARQ-ACKs with the HARQ-ACK codebook of the plurality of carriers.

14. The base station of claim 10, wherein any of the time units is defined as slot or sub-slot.

15. The method of claim 6, wherein any of the time units is defined as slot or sub-slot.

16. A terminal, comprising a memory, a processor and programs stored in the memory and executable by the processor, wherein the programs, in case of being executed by the processor, cause the processor to perform the following steps of:
adding, in a hybrid automatic repeat request (HARQ) acknowledgement (ACK) codebook which is determined according to a time offset K1 set and is transmitted in a first time unit, A bits HARQ-ACK feedback corresponding to semi-persistent scheduling (SPS) physical downlink shared channels (PDSCHs) to obtain another HARQ-ACK codebook to be transmitted, wherein the A satisfies preset conditions that the A is a number of SPS PDSCHs in time units that do not belong to a time unit set determined based on the K1 set and corresponding to the first time unit, and the SPS PDSCH is an SPS PDSCH that is deferred to feed back HARQ-ACK in the first time unit or is determined to feed back HARQ-ACK in the first time unit based on a K1 value that does not belong to the K1 set; and
transmitting the another HARQ-ACK codebook to be transmitted.

17. The terminal of claim 16, wherein the A bits HARQ-ACK corresponding to the SPS PDSCHs are concatenated at beginning or end of the HARQ-ACK codebook, and/or the A bits HARQ-ACK corresponding to the SPS PDSCHs are ordered according to at least one of a number of corresponding HARQ processes, an index of corresponding SPS configurations, an order of frequency domain positions and an order of time domain positions of A SPS PDSCH transmissions.

18. The terminal of claim 16, wherein the HARQ-ACK codebook is a dynamic or semi-static HARQ-ACK codebook.

19. The terminal of claim 18, wherein in case that the HARQ-ACK codebook is the semi-static HARQ-ACK codebook, the adding A bits HARQ-ACK feedback corresponding to SPS PDSCHs to obtain another HARQ-ACK codebook to be transmitted comprises:
determining a corresponding HARQ-ACK codebook based on the K1 set for each carrier, adding the HARQ-ACKs of SPS PDSCHs transmitted in the carrier and satisfying the preset conditions in the corresponding HARQ-ACK codebook of each carrier to obtain a corresponding concatenated HARQ-ACK codebook of each carrier, wherein a sum of the number of HARQ-ACKs of the SPS PDSCHs added in the HARQ-ACK codebook corresponding to each carrier is equal to A; and
obtaining the another HARQ-ACK codebook to be transmitted by concatenating the corresponding concatenated HARQ-ACK codebooks corresponding of each carrier according to an order of carrier index; or
in case that the HARQ-ACK codebook is the semi-static HARQ-ACK codebook, the adding A bits HARQ-ACK feedback corresponding to SPS PDSCHs to obtain another HARQ-ACK codebook to be transmitted comprises:
determining a corresponding HARQ-ACK codebook based on the K1 set for each carrier, and obtaining an HARQ-ACK codebook of a plurality of carriers by concatenating the corresponding HARQ-ACK codebooks of each carrier; and
determining A bits HARQ-ACKs corresponding to SPS PDSCHs transmitted in all carriers and satisfying the preset conditions, and obtaining the another HARQ-ACK codebook to be transmitted by concatenating the A bits HARQ-ACKs with the HARQ-ACK codebook of the plurality of carriers.

20. The terminal of claim 16, wherein any of the time units is defined as slot or sub-slot.

* * * * *